(12) United States Patent
Fujii

(10) Patent No.: US 12,717,004 B2
(45) Date of Patent: Aug. 25, 2026

(54) MEASUREMENT DEVICE UNIT MOUNTABLE AND USABLE ON VEHICLE AND OBSTACLE DETECTION METHOD FOR VEHICLE

(71) Applicant: DENSO CORPORATION, Kariya-city (JP)

(72) Inventor: Naoki Fujii, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 1016 days.

(21) Appl. No.: 17/932,186

(22) Filed: Sep. 14, 2022

(65) Prior Publication Data

US 2023/0010027 A1 Jan. 12, 2023

Related U.S. Application Data

(63) Continuation of application No. PCT/JP2021/009239, filed on Mar. 9, 2021.

(30) Foreign Application Priority Data

Mar. 18, 2020 (JP) ................................ 2020-048151

(51) Int. Cl.
*G01S 7/481* (2006.01)
*G01S 17/08* (2006.01)
*G01S 17/931* (2020.01)

(52) U.S. Cl.
CPC ............ *G01S 7/4817* (2013.01); *G01S 17/08* (2013.01); *G01S 17/931* (2020.01)

(58) Field of Classification Search
CPC ...... G01S 7/4817; G01S 17/08; G01S 17/931; G08G 1/16
See application file for complete search history.

(56) References Cited

U.S. PATENT DOCUMENTS 9,537,956 B1 1/2017 Sibenac et al.
2018/0095175 A1 4/2018 O'Keeffe
2018/0257582 A1 9/2018 Fan et al.
2022/0018961 A1* 1/2022 O'Keeffe ................ G01S 17/10
2022/0242319 A1* 8/2022 O'Keeffe ................ G01S 7/497
2022/0260677 A1* 8/2022 Yang ..................... G01S 17/003

FOREIGN PATENT DOCUMENTS

JP 2006-029916 A 2/2006
JP 2010-133200 A 6/2010
JP 2016-151519 A 8/2016
JP 2017111739 A 6/2017
JP 2019087095 A 6/2019

* cited by examiner

*Primary Examiner* — Isam A Alsomiri
*Assistant Examiner* — Joseph C Fritchman
(74) *Attorney, Agent, or Firm* — Precision Patents, P.C.

(57) ABSTRACT

A measurement device unit mountable and usable on a vehicle includes a distance measurement device that is arranged on a roof of the vehicle to detect a reflection wave corresponding to an emitted detection wave to detect a distance to an object present in a detection region, and a deflection device that is arranged on at least one of a front end portion and a rear end portion of the vehicle in the detection region to deflect a traveling direction of the detection wave toward a region outside of the detection region including a blind region of the vehicle.

5 Claims, 8 Drawing Sheets

MEASUREMENT DEVICE UNIT MOUNTABLE AND USABLE ON VEHICLE AND OBSTACLE DETECTION METHOD FOR VEHICLE

CROSS-REFERENCE TO RELATED APPLICATION

The present application is based on and claims the benefit of priority from Japanese Patent Application No. 2020-048151 filed on Mar. 18, 2020, the entire disclosure of which is incorporated herein by reference.

BACKGROUND

Technical Field

The present disclosure relates to a measurement device unit mountable and usable on a vehicle.

Related Art

Autonomous driving vehicles are equipped with a distance measurement device (for example, LiDAR or millimeter-wave radar) that detects distances to obstacles and other vehicles present around an own vehicle.

SUMMARY

As an aspect of the present disclosure, there is provided a measurement device unit mountable and usable on a vehicle. The measurement device unit includes: a distance measurement device that is configured to be arranged on a roof of the vehicle to detect a reflection wave corresponding to an emitted detection wave to detect a distance to an object present in a detection region; and a deflection device that is configured to be arranged on at least one of a front end portion and a rear end portion of the vehicle in the detection region to deflect a traveling direction of the detection wave toward a region outside of the detection region including a blind region of the vehicle.

DETAILED DESCRIPTION OF THE PREFERRED EMBODIMENTS

Autonomous driving vehicles are equipped with a distance measurement device (for example, LiDAR or millimeter-wave radar) that detects distances to obstacles and other vehicles present around an own vehicle (for example, see U.S. Pat. No. 9,537,956).

If the distance measurement device described in U.S. Pat. No. 9,537,956 is mounted on the roof of a vehicle, the detection region of the distance measurement device may be partially obstructed by a part of the vehicle such as the hood and generate a blind region. In this case, the presence of obstacles in the blind region may not be detected. This issue also applies to the case of determining the presence of obstacles in front or behind the vehicle by using the distance measurement device installed on the lateral side of the vehicle or the case of determining the presence of obstacles on the lateral side of the vehicle by using the distance measurement device installed at the rear part of the vehicle.

A. Embodiments

A1. Device Configuration

Figure 1:
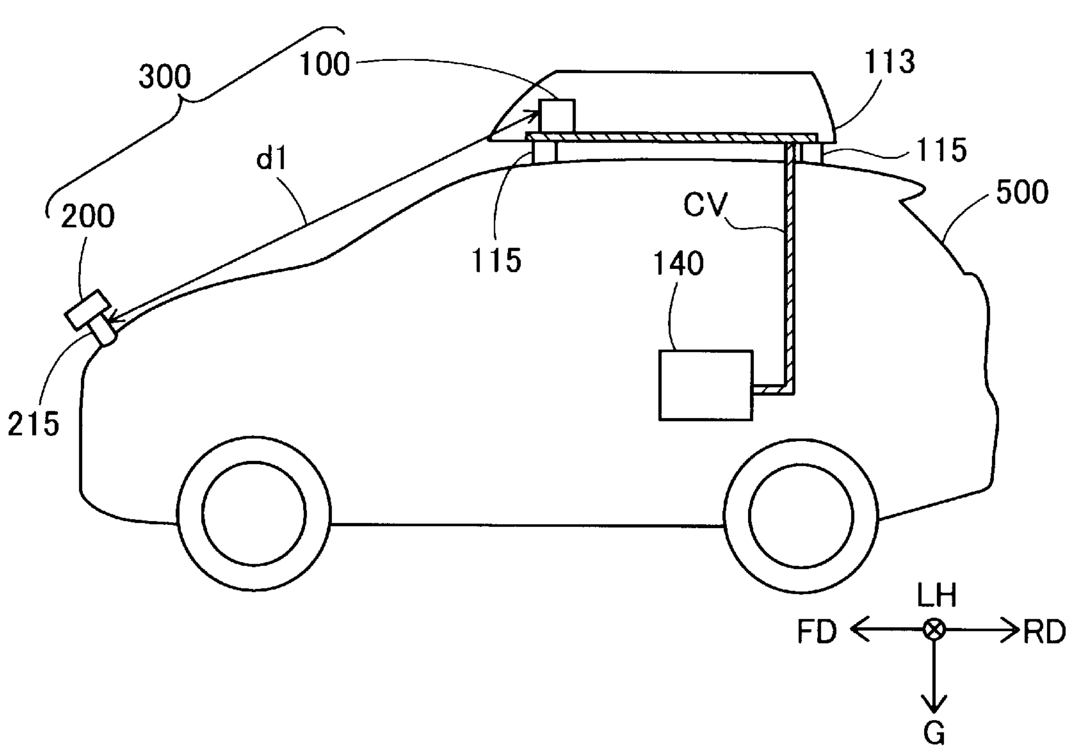
FIG. 1 is an explanatory diagram illustrating an example of a vehicle equipped with a measurement device unit as one embodiment of the present disclosure.

As illustrated in FIG. 1, a measurement device unit 300 according to a first embodiment is mounted and used on a vehicle 500. The measurement device unit 300 acquires information on surroundings of the vehicle 500, for example, distances to objects around the vehicle 500 to detect an obstacle present around the vehicle 500. The measurement device unit 300 is mounted on the roof of the vehicle 500 and is fixed to the vehicle 500 by a fixing mechanism 115 and a frame 113. FIG. 1 illustrates a vehicle width direction LH, a vehicle forward direction FD, a vehicle rearward direction RD, and a vertically downward direction G.

The vehicle 500 is equipped with a driving assistance control device 140 for providing driving assistance, in addition to the measurement device unit 300. The driving assistance control device 140 is installed in the vehicle 500 and connected to the measurement device unit 300 by one cable CV. The driving assistance control device 140 is configured as one or more ECUs including a CPU, a memory, and an interface not illustrated. The driving assistance control device 140 controls a driving device, a steering device, and a braking device installed in the vehicle 500 to provide driving assistance such as braking assistance, steering assistance, and driving assistance of the vehicle 500. Besides, the vehicle 500 may include a wheel speed sensor, a yaw rate sensor, and the like. The driving assistance control device 140 may be an autonomous driving control device for executing autonomous driving of the vehicle 500.

The measurement device unit 300 includes at least a distance measurement device 100 and a deflection device 200. For the purpose of forward detection, for example, the distance measurement device 100 is arranged in the center of the front part of the roof of the vehicle 500. The distance measurement device 100 emits laser light as detection waves and receives reflection light from an object as reflection waves, to thereby detect the distance from the object to the vehicle 500 and the shape of the object. In the present embodiment, the distance measurement device 100 is a Light Detection And Ranging (LiDAR). Detailed configuration of the distance measurement device 100 will be described later.

The deflection device 200 deflects the traveling direction of the detection light emitted from the distance measurement device 100 toward outside of the detection region of the distance measurement device 100, for example, toward a blind region of the vehicle 500. More precisely, the "blind region of the vehicle 500" refers to the blind region that cannot be recognized by the distance measurement device 100 and in which the traveling of the emitted detection light is obstructed by a part of the vehicle 500. The deflection device 200 is arranged on the vehicle 500 within the detection region of the distance measurement device 100, for example, at one end of the hood of the vehicle 500 as seen in a vehicle width direction LH. In the present embodiment, the deflection device 200 is attached to a leading end of a pole 215 fixed to a fender of the vehicle 500. A distance d1 between the distance measurement device 100 and the deflection device 200 is 2.0 meters, for example. Although described in detail later, in the present embodiment, the deflection device 200 is formed of a reflection device that includes a reflector such as a mirror or glass, for example. Accordingly, at the time of attaching the deflection device 200 to the vehicle 500, the angle of the deflection device 200 is adjusted such that the deflection device 200 can reflect the detection light incident on the reflector toward a region outside of the detection region including the blind region.

Figure 2:
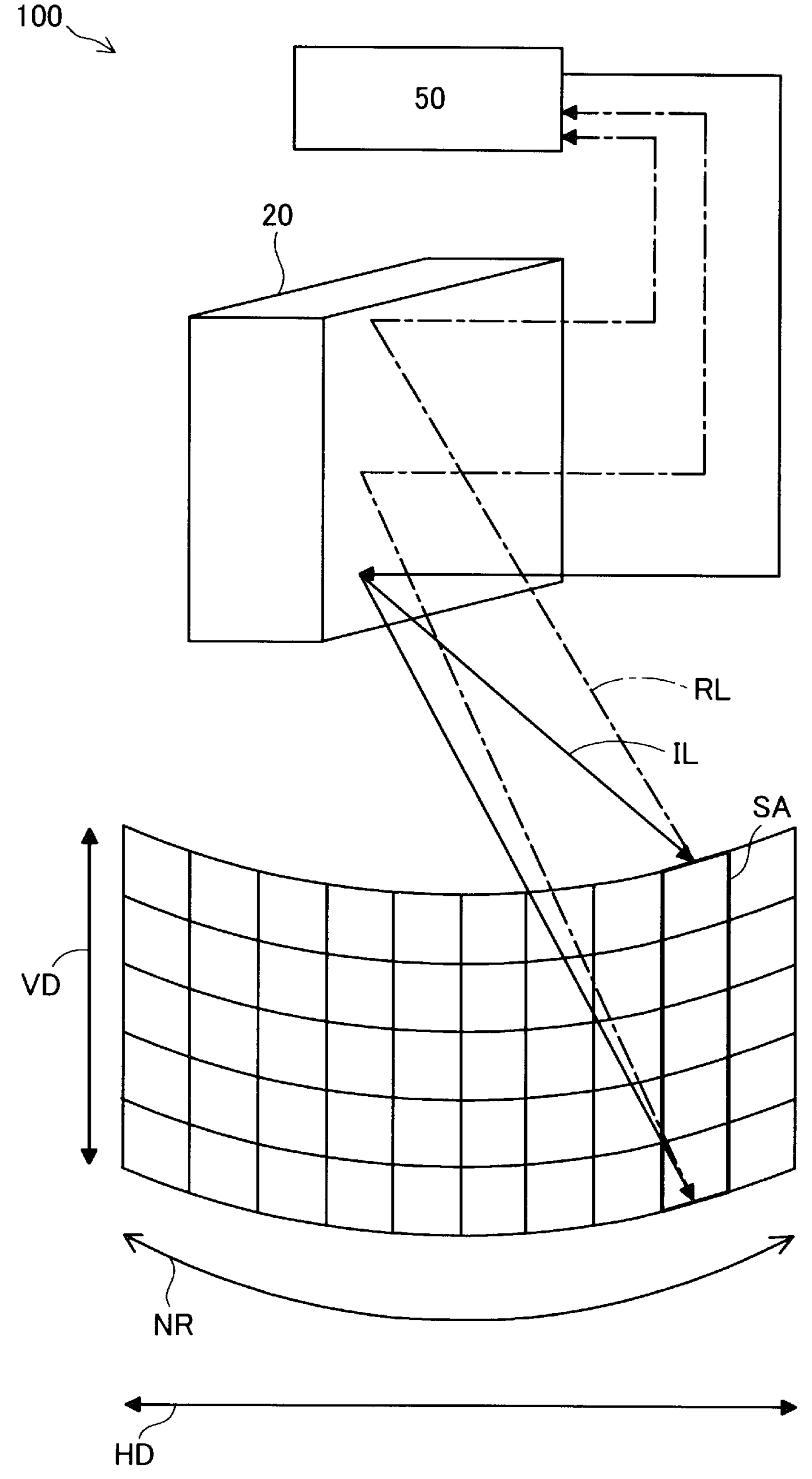
FIG. 2 is an explanatory diagram illustrating a schematic configuration of a LiDAR.

As illustrated in FIG. 2, the distance measurement device 100 includes a light emission/reception unit 20 and a control device 50. The distance measurement device 100 emits detection light IL and receives reflection light RL at unit scanning angles obtained by dividing a predetermined scanning angle range NR into a plurality of angles to acquire detection points in the entire scanning angle range NR, thereby implementing distance measurement. The distance measurement device 100 executes the acquirement of the detection points, that is, the light emission and reception processing at one-direction scanning in the scanning angle range NR in a forward direction or at reciprocating scanning in the scanning angle range NR in two directions.

The light emission/reception unit 20 executes a light emission process and a light reception process. Specifically, the light emission/reception unit 20 executes the light emission process of emitting detection light IL by driving a light emission element in accordance with a light emission control signal for instructing the light emission element to emit light, issued from the control device 50 at each unit scanning angle. The light emission element is one or more infrared laser diodes, for example, and emits infrared laser light as the detection light IL. The light emission/reception unit 20 executes the light reception process of outputting an incident light intensity signal in accordance with the amount of incident light or the intensity of incident light on light reception pixels formed by a single photon avalanche diode (SPAD) or another photodiode, for example, at unit scanning angles at which light emission is executed.

The light emission/reception unit 20 includes a scanning mirror not illustrated. The scanning mirror is a mirror body that scans a subject with the emitted detection light IL in the horizontal direction HD. The scanning mirror is driven in a reciprocating manner by an electric motor, such as an ultrasonic motor, brushless motor, or brush motor, including a known mechanism for producing reciprocating motion in the scanning angle range NR, to thereby implement scanning in the scanning angle range NR in the horizontal direction HD. The detection light IL is reflected by the scanning mirror and is applied for scanning at the unit scanning angle SA in the scanning angle range NR in the horizontal direction HD. The reflection light RL from the target object reflecting the detection light IL is reflected by the scanning mirror and enters at each unit scanning angle SA. The unit scanning angle SA at which the light reception process is performed is sequentially incremented to enable scanning for the light reception process in the desired scanning angle range NR. In addition to the scanning in the horizontal direction HD, the scanning in the vertical direction VD may be implemented by providing a configuration for swinging the scanning mirror in the vertical direction VD or using a multifaceted mirror, for example, a polygonal mirror, as the scanning mirror. The scanning mirror may not be rotated by an electric motor. The light emission/reception unit 20 may not include the scanning mirror but may include a plurality of light emission elements and a plurality of light reception elements arranged in an array to directly emit laser light in sequence to the outside and directly receive the reflection light RL.

Figure 3:
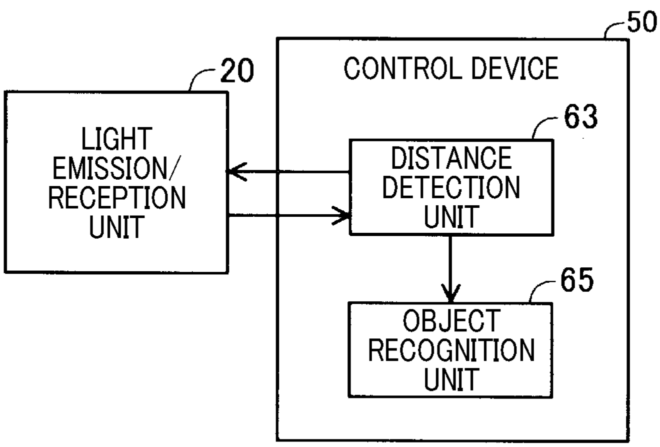
FIG. 3 is a block diagram illustrating a functional configuration of the LiDAR.

As illustrated in FIG. 3, the control device 50 controls the general operation of the distance measurement device 100. The control device 50 includes a distance detection unit 63 and an object recognition unit 65. The distance detection unit 63 uses an incident light control signal from the light emission/reception unit 20 to calculate a time from the emission of the detection light IL by the light emission/reception unit to the entry of the reflection light RL into the light emission/reception unit 20 (time of flight: TOF), to thereby detect the distances to objects present in the detection region of the distance measurement device 100. The object recognition unit 65 uses the detected distances to recognize objects present around the vehicle 500, for example, surrounding objects such as preceding vehicles, oncoming vehicles, road side objects, falling objects, and pedestrians. In the present embodiment, the object recognition unit 65 executes an obstacle detection process described later to determine the presence or absence of an obstacle in the blind region in the vehicle forward direction FD.

Figure 4:
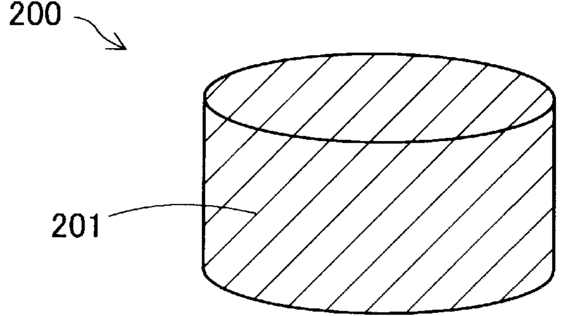
FIG. 4 is an explanatory diagram illustrating a schematic configuration of a deflection device.

As illustrated in FIG. 4, the deflection device 200 has a columnar outer shape. The outer surface of the deflection device 200 is covered with a reflector 201. The reflector 201 reflects the detection light IL emitted from the distance measurement device 100. The reflector 201 is formed by coating the entire outer surface of the deflection device 200 with a reflective material such as a metallic thin film for mirror or glass thin film. In the present embodiment, the entire deflection device 200 entirely includes the reflector 201 so that the deflection device 200 can reflect the detection light IL entering any place in the deflection device 200. The reflector 201 may be any other member that is capable of reflecting laser light, and may be formed so as to increase the reflectance at the laser light wavelength. The outer shape of the deflection device 200 is not limited to a columnar shape but may be any other shape having a curved surface such as an oval shape or a spherical shape.

Assuming that the distance between the distance measurement device 100 and the deflection device 200 is the distance d1 (2.0 meters) described above, if the resolving power (resolution) of the distance measurement device 100 in the horizontal direction HD is 0.2 degrees, the resolution at the arrangement position of the deflection device 200 in the horizontal direction HD is 0.7 centimeters. Thus, the size (diameter) of the deflection device 200 is at least 0.7 centimeter. In order to reflect the detection light IL in a wider range, the size of the deflection device 200 is preferably in a range of two centimeters to five centimeters, and more preferably in a range of three centimeters to four centimeters.

As illustrated in FIG. 4, the deflection device 200 has a curved surface. Accordingly, the reflector 201 can reflect the detection light IL at various angles in accordance with the angle of incidence of the detection light IL from the distance measurement device 100.

Figure 5:
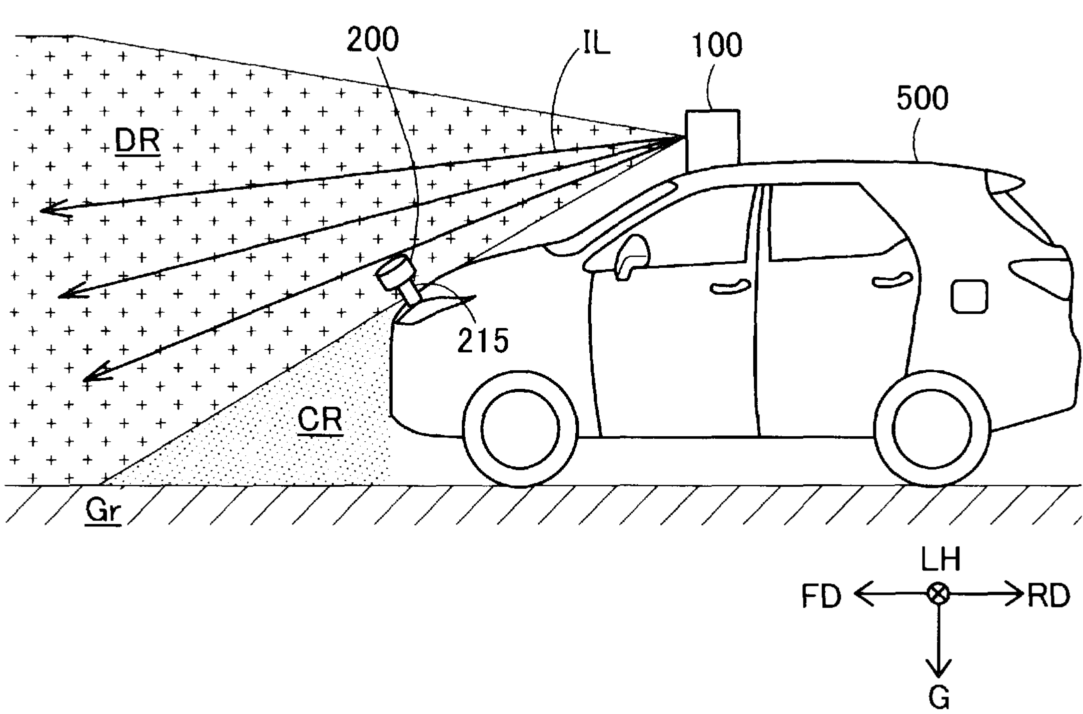
FIG. 5 is an explanatory diagram schematically illustrating an arrangement position of the deflection device.
Figure 6:
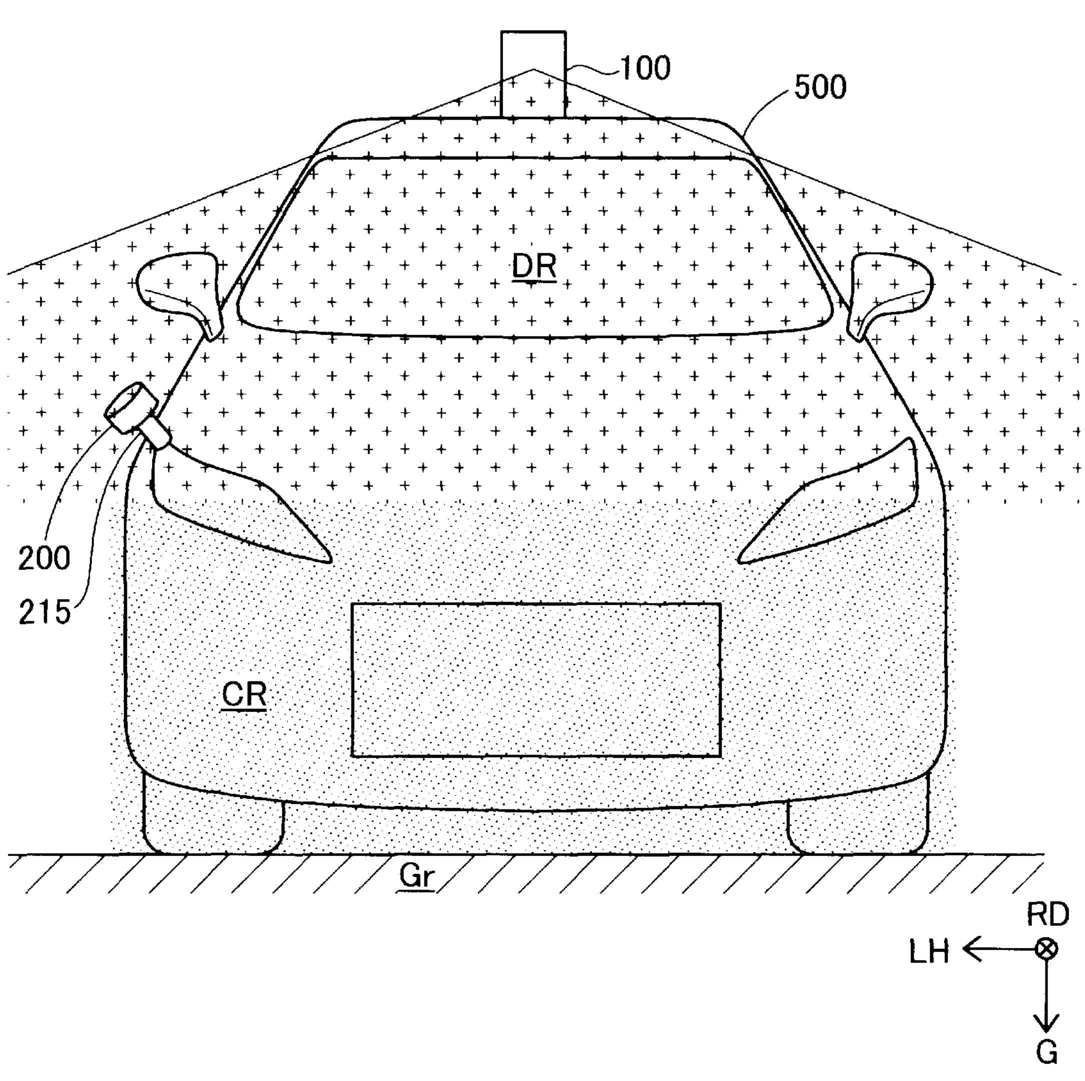
FIG. 6 is an explanatory diagram schematically illustrating an arrangement position of the deflection device.

As illustrated in FIGS. 5 and 6, the deflection device 200 is arranged on the vehicle 500 within a detection region DR of the distance measurement device 100. In FIGS. 5 and 6, for the convenience of representation, the fixing mechanism 115 and the frame 113 of the measurement device unit 300 and the reflector 201 of the deflection device 200 are not illustrated. The detection region DR of the distance measurement device 100 is in an area ahead of the vehicle 500 if the distance measurement device 100 is arranged in the center of the front part of the roof of the vehicle 500. Ahead of the hood of the vehicle 500, there is a blind region CR that cannot be recognized by the distance measurement device 100.

Figure 7:
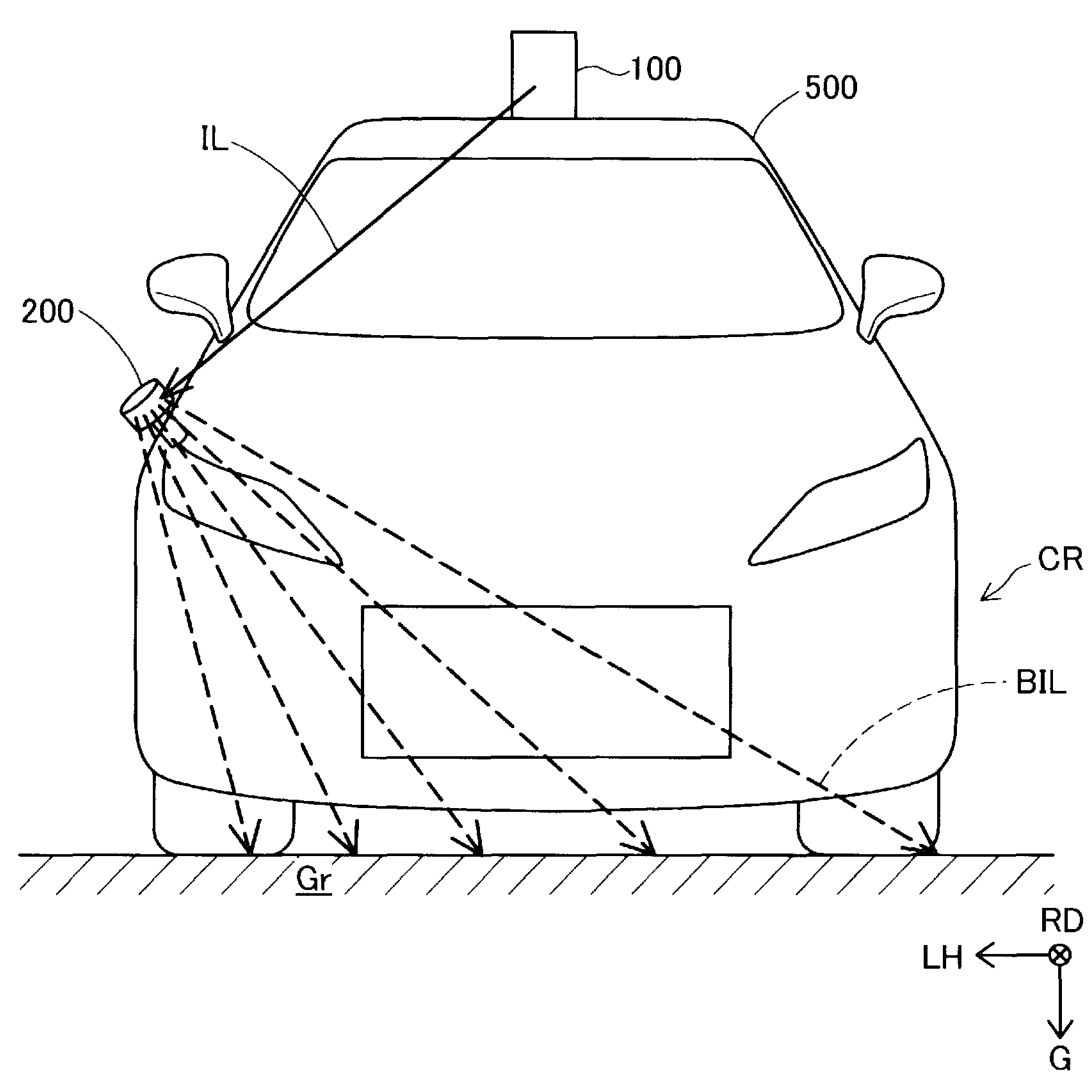
FIG. 7 is an explanatory diagram schematically illustrating reflection of detection light by the deflection device.

As illustrated in FIG. 7, the deflection device 200 reflects the detection light IL emitted from the distance measurement device 100 toward a region outside of the detection region DR including the blind region CR so that reflected detection light BIL reaches the blind region CR as illustrated by a broken-line arrow. In other words, the deflection device 200 deflects the traveling direction of the detection light IL from the distance measurement device 100 toward a region outside of the detection region DR including the blind region CR, to thereby guide the detection light IL to the blind region CR. Therefore, the distance measurement device 100 can receives the reflection light corresponding to the detection light BIL guided to the blind region CR, to thereby detect an object present in the blind region CR.

A2. Obstacle Detection Process

Figure 8:
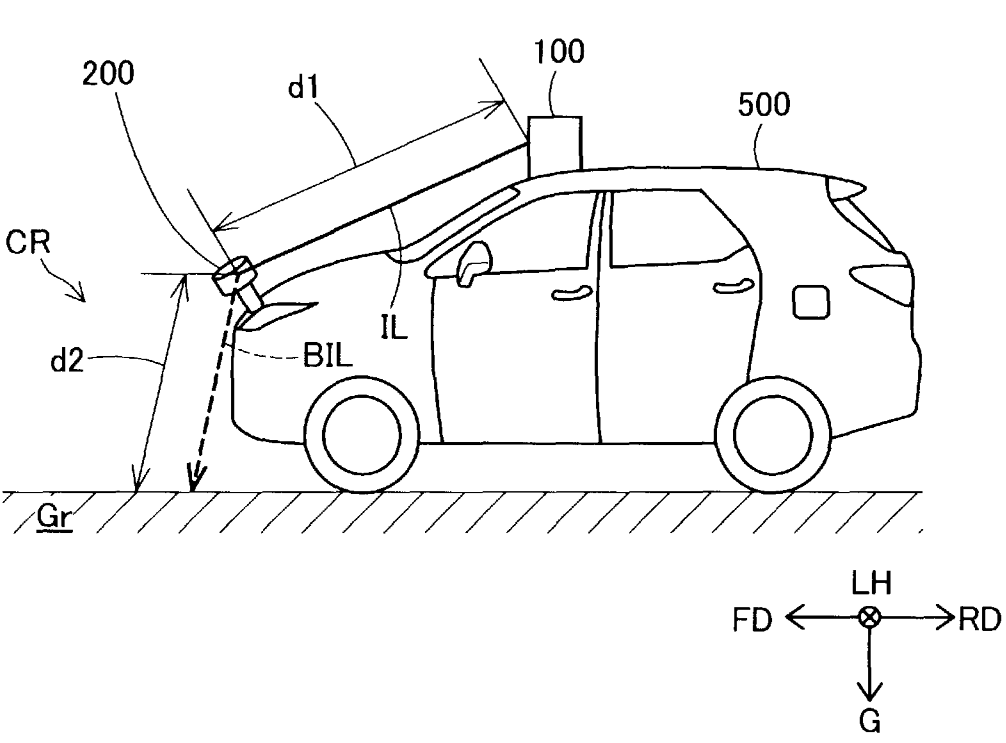
FIG. 8 is an explanatory diagram for describing an example of distance measurement results in a blind region.

First, an outline of the obstacle detection process will be described. As illustrated in FIG. 8, if there is no obstacle in the blind region CR, the detection light IL emitted from the distance measurement device 100 is reflected by the deflection device 200 toward the blind region CR, and the detection light BIL guided to the blind region CR reaches ground Gr. At this time, the distance detection unit 63 acquires the sum of the distance d1 from the distance measurement device 100 to the deflection device 200 and the distance d2 from the deflection device 200 to the ground Gr, as the result of distance measurement in the blind region CR.

Figure 9:
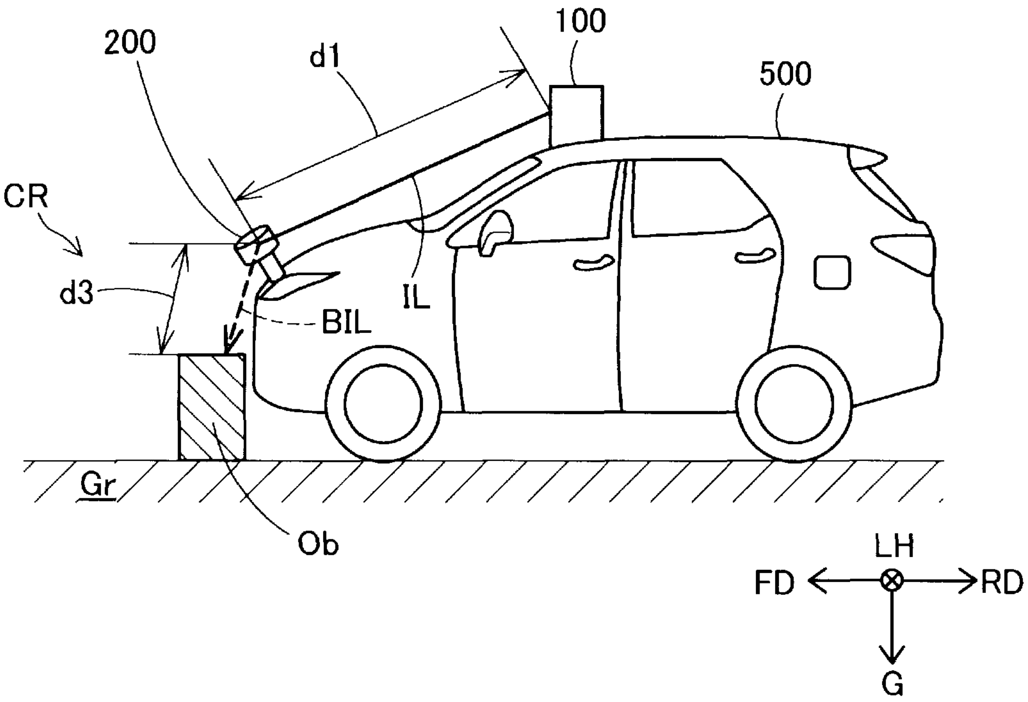
FIG. 9 is an explanatory diagram for describing another example of distance measurement results in the blind region.

On the other hand, as illustrated in FIG. 9, if there is an obstacle Ob in the blind region CR, the detection light BIL guided to the blind region CR by the deflection device 200 reaches the obstacle Ob. The detection light BIL is obstructed by the obstacle Ob and does not reach the ground Gr. At this time, the distance detection unit 63 acquires the sum of the distance d1 from the distance measurement device 100 to the deflection device 200 and a distance d3 from the deflection device 200 to the obstacle Ob as the result of distance measurement in the blind region CR. The distance d3 is shorter than the distance d2 by the height of the obstacle Ob. Therefore, it can be said that if the obstacle Ob is present in the blind region CR, a short distance is detected as compared to the case in which no obstacle Ob is present in the blind region CR.

In the obstacle detection process described later, the result of distance measurement in the blind region CR is acquired, and it is determined whether the detected distance is shorter than the above sum of the distance d1 and the distance d2 to determine whether the obstacle Ob is present in the blind region CR. Hereinafter, the obstacle detection process will be described in detail.

Figure 10:
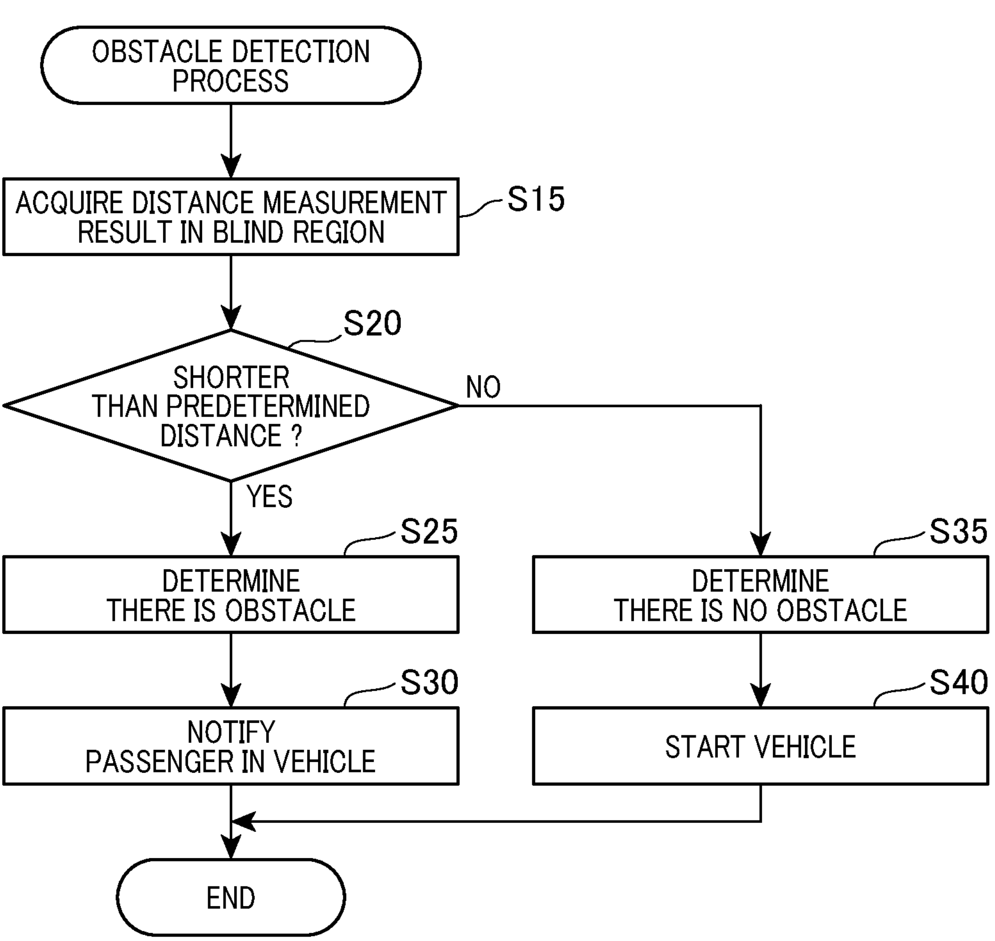
FIG. 10 is a flowchart illustrating a procedure of an obstacle detection process.

The obstacle detection process illustrated in FIG. 10 is executed at the start of the vehicle 500. For example, the obstacle detection process is started when a signal indicating that the shift device in the vehicle 500 has been switched to the position for requesting forward traveling is input into the control device 50 from a higher-level ECU controlling the entire vehicle 500. The distance detection unit 63 acquires the result of distance measurement in the blind region CR (step S15). The object recognition unit 65 determines whether the detected distance is shorter than a predetermined distance (step S20). In the present embodiment, the "predetermined distance" refers to the sum of the distance d1 from the distance measurement device 100 to the deflection device 200 and the distance d2 from the deflection device 200 to the ground Gr. When determining that the detected distance is shorter than the predetermined distance (step S20: YES), the object recognition unit 65 determines that the obstacle Ob is present in the blind region CR (step S25).

The object recognition unit 65 notifies the status to the passenger in the vehicle 500 (step S30). Specifically, the object recognition unit 65 uses a speaker or a display device installed in the vehicle 500 to notify that the vehicle 500 cannot be started due to the presence of the obstacle Ob in the vehicle forward direction FD. If the vehicle 500 is remotely steered at the management center or if the vehicle 500 is a public transport system and the traveling of the vehicle 500 is managed at the management center, the object recognition unit 65 may notify to the management center that the vehicle 500 cannot be started.

When determining in step S20 that the detected distance is equal to or longer than the predetermined distance (step S20: NO), the object recognition unit 65 determines that the obstacle Ob is not present in the blind region CR (step S35). The object recognition unit 65 causes the driving assistance control device 140 to start the vehicle 500 (step S40). After execution of step S40 or step S30, the obstacle detection process is ended.

The measurement device unit 300 of the present embodiment configured as described above includes the distance measurement device 100 that is arranged on the vehicle 500 to detect the reflection light RL corresponding to the emitted detection light IL to detect the distance to an object present in the detection region DR, and includes the deflection device 200 that is arranged on the vehicle 500 in the detection region DR to reflect the traveling direction of the detection light IL toward a region outside of the detection region DR including the blind region CR of the vehicle 500, and thus can accurately detect the presence of the obstacle Ob in the blind region CR. Specifically, according to the measurement device unit 300 of the present embodiment, the distance measurement device 100 can detect the presence or absence of an object in the blind region CR as well as the presence or absence of an object present in the detection region DR. This eliminates the need to additionally provide a distance measurement device different from the distance measurement device 100 in order to detect the presence or absence of an object in the blind region CR. This also eliminates the need to mount a large number of distance measurement devices on the vehicle 500 in order to prevent the occurrence of a blind region not only in the vehicle forward direction FD but also at the side of the vehicle 500 or in the vehicle rearward direction RD of the vehicle 500. This suppresses a problem of increase in parts count of the vehicle 500 and a problem of increase in the weight and power consumption of the vehicle 500.

In addition, if the distance detected in the blind region CR is shorter than the predetermined distance, the object recognition unit 65 determines that the obstacle Ob is present in the blind region CR, so that it is easy to determine the presence or absence of the obstacle Ob in the blind region CR. Since the deflection device 200 is a reflection device that includes the reflector 201 having a curved surface, the deflection device 200 can reflect the detection light IL at various angles in accordance with the angle of incidence of the detection light IL, as compared to a deflection device including a reflector having a plane surface. Accordingly, the deflection device 200 can guide the detection light IL in a wider range of the blind region CR.

B. Other Embodiments (1) In the foregoing embodiment, the distance measurement device 100 may include a light emission element in a rotating body that is rotationally driven by a motor or the like in the horizontal direction HD. In this configuration, along with the rotation of the rotating body in the horizontal direction HD, the emission direction of the detection light IL to be emitted is changed. Accordingly, the size of the deflection device 200 can be set in accordance with the rotation speed of the rotating body and the intervals of emission of the detection light IL. For example, assuming that the distance between the distance measurement device 100 and the deflection device 200 is the distance d1 (2.0 meters), if the resolving power of the rotating body in the rotation direction is 0.3 degrees, the detection light IL is emitted at intervals of about one centimeter in the horizontal direction HD. Thus, setting the size of the deflection device 200 to about 1.0 centimeter allows the detection light IL to be reflected to the blind region CR. Increasing the size of the deflection device 200, more specifically, increasing the size (area) of the surface of the deflection device 200 which the detection light IL enters improves the accuracy of reflection of the detection light IL.

(2) In the foregoing embodiments, the outer shape of the deflection device 200 is a column, but may be a rectangular parallelepiped. The reflector 201 of the deflection device 200 has a curved surface, but may have a planar surface. The outer surface of the deflection device 200 is entirely covered with the reflector 201, but the deflection device 200 may include the reflector 201 at least on the surface facing the distance measurement device 100. In this case, the deflection device 200 may include a plurality of reflectors 201. For example, the reflectors 201 may be arranged at predetermined equal spaces on the side surface of the deflection device 200. The predetermined spacing can be arbitrarily set in accordance with the resolving power of the distance measurement device 100 in the horizontal direction HD, and for example, may be 0.7 centimeters. The deflection device 200 may not be provided with the reflector 201. For example, the deflection device 200 itself may be formed of a reflection device of a mirror, glass, or a metal with a polished surface.

(3) In the foregoing embodiments, the deflection device 200 may be a refracting device such as a prism, instead of the reflection device. That is, the present disclosure may be applied to a deflection device that generally reflects or refracts (bends) the detection light IL emitted from the distance measurement device 100 to deflect the traveling direction of the detection light IL toward a region outside of the detection region DR including the blind region CR. The deflection device 200 may be formed of a part of the body of the vehicle 500.

(4) In the foregoing embodiments, the control device 50 may not function as the object recognition unit 65. For example, the driving assistance control device 140 may have the function of the object recognition unit, or an object recognition device functioning as the object recognition unit may be provided separately from the distance measurement device 100 and the driving assistance control device 140.

(5) In the foregoing embodiments, the deflection device 200 is arranged at one end of the hood of the control device 50 as seen in the vehicle width direction LH, but the present disclosure is not limited to this configuration. For example, the deflection device 200 may be arranged in the center of the hood as seen in the vehicle width direction LH, instead of or in addition to the end portion of the hood as seen in the vehicle width direction LH. That is, the deflection device 200 may generally be arranged at any other position on the vehicle 500 within the detection region DR of the distance measurement device 100.

(6) In the foregoing embodiments, the distance measurement device 100 is mounted in the center of the front part of the roof of the vehicle 500, but the present disclosure is not limited to this configuration. For example, the distance measurement device 100 may be mounted in the center of the rear part of the roof of the vehicle 500. In this case, the deflection device 200 may be arranged at an end portion of the rear bumper as seen in the vehicle width direction LH, at a position where the deflection device 200 can deflect the detection light IL from the distance measurement device 100 toward the lower area behind the vehicle 500. According to this configuration, it is possible to detect the presence of an obstacle in the lower area behind the vehicle 500 that is invisible from the distance measurement device 100. Alternatively, for example, the distance measurement device 100 may be mounted on the rear bumper. In this case, the deflection device 200 may be arranged at an end portion of the rear bumper as seen in the vehicle width direction LH, at a position where the deflection device 200 can deflect the detection light IL from the distance measurement device 100 toward the side of the vehicle 500. According to this configuration, it is possible to detect the presence of an obstacle at the side of the vehicle 500 that is invisible from the distance measurement The distance measurement device 100 may be mounted on the side of the vehicle 500, for example, at the lower part of the front door. In this case, the deflection device 200 may be arranged at an end portion of the front bumper as seen in the vehicle width direction LH, at a position where the deflection device 200 can deflect the detection light IL from the distance measurement device 100 in the vehicle forward direction FD. According to this configuration, it is possible to detect the presence of an obstacle ahead of the vehicle 500 that is invisible from the distance measurement device 100. In addition, in this configuration, the deflection device 200 may be arranged at an end portion of the rear bumper as seen in the vehicle width direction LH, at a position where the deflection device 200 can deflect the detection light IL from the distance measurement device 100 in the vehicle rearward direction RD. According to this configuration, it is possible to detect the presence of an obstacle behind the vehicle 500 that is invisible from the distance measurement device 100.

(7) In the foregoing embodiments, the obstacle detection process is executed at the start of forward traveling of the vehicle 500. Alternatively, if the distance measurement device 100 is arranged at the rear part or the side of the vehicle 500 for the purpose of rearward detection of the vehicle 500, the obstacle detection process may be executed at the start of rearward traveling of the vehicle 500.

The components such as the control unit in the present disclosure and the methods executed by the components may be implemented by a dedicated computer including a processor or a memory programmed to execute one or more functions embodied by computer programs. The components such as the control unit in the present disclosure and the methods executed by the components may be implemented by a dedicated computer including a processor formed of one or more dedicated hardware logical circuits. The components such as the control unit in the present disclosure and the methods executed by the components may be implemented by one or more dedicated computers including a combination of a processor and a memory programmed to execute one or more functions and a processor including one or more hardware logical circuits. The computer programs may be stored, as instructions to be executed by a computer, in a computer-readable non-transient tangible recording medium.

The present disclosure can be carried out in the mode described below.

According to the embodiment of the present disclosure, there is provided a measurement device unit (300) mountable and usable on a vehicle (500). The measurement device unit includes: a distance measurement device (100) that is arranged on a roof of the vehicle to detect a reflection wave (RL) corresponding to an emitted detection wave (IL) to detect a distance to an object present in a detection region (DR); and a deflection device (200) that is arranged on at least one of a front end portion and a rear end portion of the vehicle in the detection region to deflect a traveling direction of the detection wave toward a region outside of the detection region including a blind region (CR) of the vehicle.

According to the embodiment, the measurement device unit includes the distance measurement device that is arranged on the vehicle to detect the reflection wave corresponding to the emitted detection wave to detect the distance to an object present in the detection region, and includes the deflection device that is arranged on the vehicle in the detection region to deflect the traveling direction of the detection wave toward a region outside of the detection region including the blind region of the vehicle, whereby it is possible to accurately detect the presence of an object in the blind region.

The present disclosure can be carried out in various modes. For example, the present disclosure can be carried out in the modes of an object recognition device, an obstacle detection device, an obstacle detection method, a computer program for implementing these devices and method, a storage medium storing the computer program, and the like.

The present disclosure is not limited to the embodiments described above but can be carried out in various configurations without departing from the gist of the present disclosure. For example, the technical features in the aspects described in Summary can be replaced or combined with each other as appropriate to solve some or all of the foregoing issues or to attain some or all of the above advantageous effects. In addition, the technical features can be deleted as appropriate unless they are described as essential herein.

What is claimed is:

1. A measurement device unit mountable and usable on a vehicle, comprising:

a distance measurement device that is configured to be arranged on a roof of the vehicle to detect a reflection wave corresponding to an emitted detection wave to detect a distance to an object present in a detection region; and a deflection device that is configured to be arranged on at least one of an end portion in a width direction of a front bumper and an end portion in a width direction of a rear bumper of the vehicle in the detection region to deflect a traveling direction of the detection wave toward a region outside of the detection region including a blind region of the vehicle in which the detection wave is obstructed by a body of the vehicle, by causing the detection wave travelling outward in the width direction from a center part of the vehicle to turn inward in the width direction.

2. The measurement device unit according to claim 1, further comprising an obstacle recognition unit that is configured to recognize presence of an obstacle around the vehicle by using the detected distance, wherein the obstacle recognition unit determines that the obstacle is present in the blind region if the distance detected in the blind region is shorter than a predetermined distance.

3. The measurement device unit according to claim 1, wherein the deflection device is a reflection device.

4. The measurement device unit according to claim 3, wherein the reflection device includes a reflector that reflects the detection wave, and the reflector has a curved surface.

5. The measurement device unit according to claim 1, wherein the deflection device is a refracting device.

* * * * *